US008275805B2

(12) United States Patent
Chhugani et al.

(10) Patent No.: US 8,275,805 B2
(45) Date of Patent: Sep. 25, 2012

(54) METHOD OF DECREASING A TOTAL COMPUTATION TIME FOR A VISUAL SIMULATION LOOP IN A VIRTUAL WORLD APPLICATION

(75) Inventors: Jatin Chhugani, Santa Clara, CA (US); Bryan Catanzaro, Albany, CA (US); Sanjeev Kumar, San Jose, CA (US); Changkyu Kim, San Jose, CA (US); Nadathur Rajagopalan Satish, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 321 days.

(21) Appl. No.: 12/732,392

(22) Filed: Mar. 26, 2010

(65) Prior Publication Data

US 2011/0238680 A1    Sep. 29, 2011

(51) Int. Cl.
   *G06F 17/30* (2006.01)
(52) U.S. Cl. ........................................ 707/802
(58) Field of Classification Search .............. 707/802, 707/999.1
   See application file for complete search history.

(56) References Cited

U.S. PATENT DOCUMENTS

| 5,816,820 | A  | * | 10/1998 | Heinz et al. ............ 434/118 |
| 7,729,538 | B2 | * | 6/2010  | Shilman et al. ......... 382/181 |
| 2006/0244754 | A1 | | 11/2006 | Beda et al. |
| 2008/0062183 | A1 | | 3/2008 | Swaelens |

FOREIGN PATENT DOCUMENTS

| EP | 1304646 A2 | 4/2003 |
| WO | 02/097780 A1 | 12/2002 |

OTHER PUBLICATIONS

C. J. Huges, R. Grzeszczuk, E. Sifakis, D. Kim, S. Kumar, A. Selle, J. Chhugani, M. Holliman, and Y.K. Chen, "Physical Simulation for Animatin and Visual Effects: Parallelization and Characterization for Chip Multiprocessors", ACM Digital Library, ISCA 2007, Jun. 9-13, 2007, pp. 220-231.*
Alexander Reshetov, et al., Multi-Level Ray Tracing Algorithm, 2005, pp. 1176-1185, Association for Computing Machinery, Inc.
Ingo Wald, On fast Construction of SAH Based Bounding Volume Hierarchies, Proceedings of 2007 Eurographics/IEEE Symposium on Interactive Ray-Tracing, pp. 1-8, 1SCI Institute, University of Utah.
Combined Search and Examination Report received for United Kingdom Patent Application No. GB104574.7, mailed on Jul. 1, 2011, 3 pages.

* cited by examiner

*Primary Examiner* — Cheryl Lewis
(74) *Attorney, Agent, or Firm* — Kenneth A. Nelson (57) ABSTRACT

A method of decreasing a total computation time for a visual simulation loop includes sharing a common data structure across each phase of the visual simulation loop by adapting the common data structure to a requirement for each particular phase prior to performing a computation for that particular phase.

19 Claims, 5 Drawing Sheets

METHOD OF DECREASING A TOTAL COMPUTATION TIME FOR A VISUAL SIMULATION LOOP IN A VIRTUAL WORLD APPLICATION

FIELD OF THE INVENTION

The disclosed embodiments of the invention relate generally to computer-generated imagery, and relate more particularly to methods for increasing efficiency for computer-generated imagery.

BACKGROUND OF THE INVENTION

Virtual World applications typically consist of different phases that are executed both on the server and client to give a sense of 3D realism to the user. For example, the server performs physical simulations and AI (artificial intelligence) to advance the objects and uses visibility computations to compute the visible set that is transferred to the client. Likewise, the client performs (effect-based) physical simulations and rendering (using ray-tracing and/or rasterization) to display the scene. Each of these "computational kernels" maintains and builds its own data structures to speed up its respective computations. These computational kernels are different from each other as each of them is optimized for its own task (like speeding up neighbor computation vs. minimizing the number of triangles in each node vs. minimizing the empty space in the nodes). (The terms "phase," "kernel," and "computational kernel" are used synonymously herein.)

BRIEF DESCRIPTION OF THE DRAWINGS

The disclosed embodiments will be better understood from a reading of the following detailed description, taken in conjunction with the accompanying figures in the drawings in which.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

DETAILED DESCRIPTION OF THE DRAWINGS

In one embodiment of the invention, a method of decreasing a total computation time for a visual simulation loop comprises sharing a common data structure across each phase of the visual simulation loop by adapting the common data structure to a requirement for each particular phase prior to performing a computation for that particular phase.

With the advent of many-core architectures, the different computational kernels mentioned earlier will likely be executed on the same processor, with shared resources like caches, memory controllers, buses, and so forth. Therefore, building and maintaining their own states not only increases the time to build these data structures but also requires more resources to store them. As an example, physical simulation typically takes about 10 to 20 percent of total processing time (per frame) for the construction of acceleration data structures (e.g., bounding volume hierarchies (BVH), kd-trees, and the like) and ray tracing takes about 30 to 40 percent of the processing time (per frame) to build its data structures. The size of the data structures is typically the same for each, leading to a two-fold increase in total processing time.

Building data structures (or acceleration hierarchies) to speed up specific computational tasks is well-known. However, these data structures are built and maintained in isolation, with no cross-application information sharing and with no one data structure being used for all the tasks (like physics, graphics, and AI in the case of visual simulation). In contrast, embodiments of the invention build and maintain one common data structure across the complete visual simulation loop. This "common data structure" can, at low cost, be modified to achieve performance that is nearly as good as the performance of individual optimized data structures. This allows a significant reduction in construction costs with only a small increase in runtime for each individual algorithm while achieving all the benefits of a shared architecture. The result is a net improvement in construction plus usage cost, i.e., an increase in the net frame rate.

Embodiments of the invention share the common data structure across different applications, adapting them as necessary for the requirements of the various applications. This time-efficient and space-efficient data structure sharing enables efficient use of resources as well as performance enhancement. For multi-core and many-core architectures running these applications on the same platform, embodiments of the invention also save memory space, improve cache locality, and reduce data structure build time.

Figure 1:
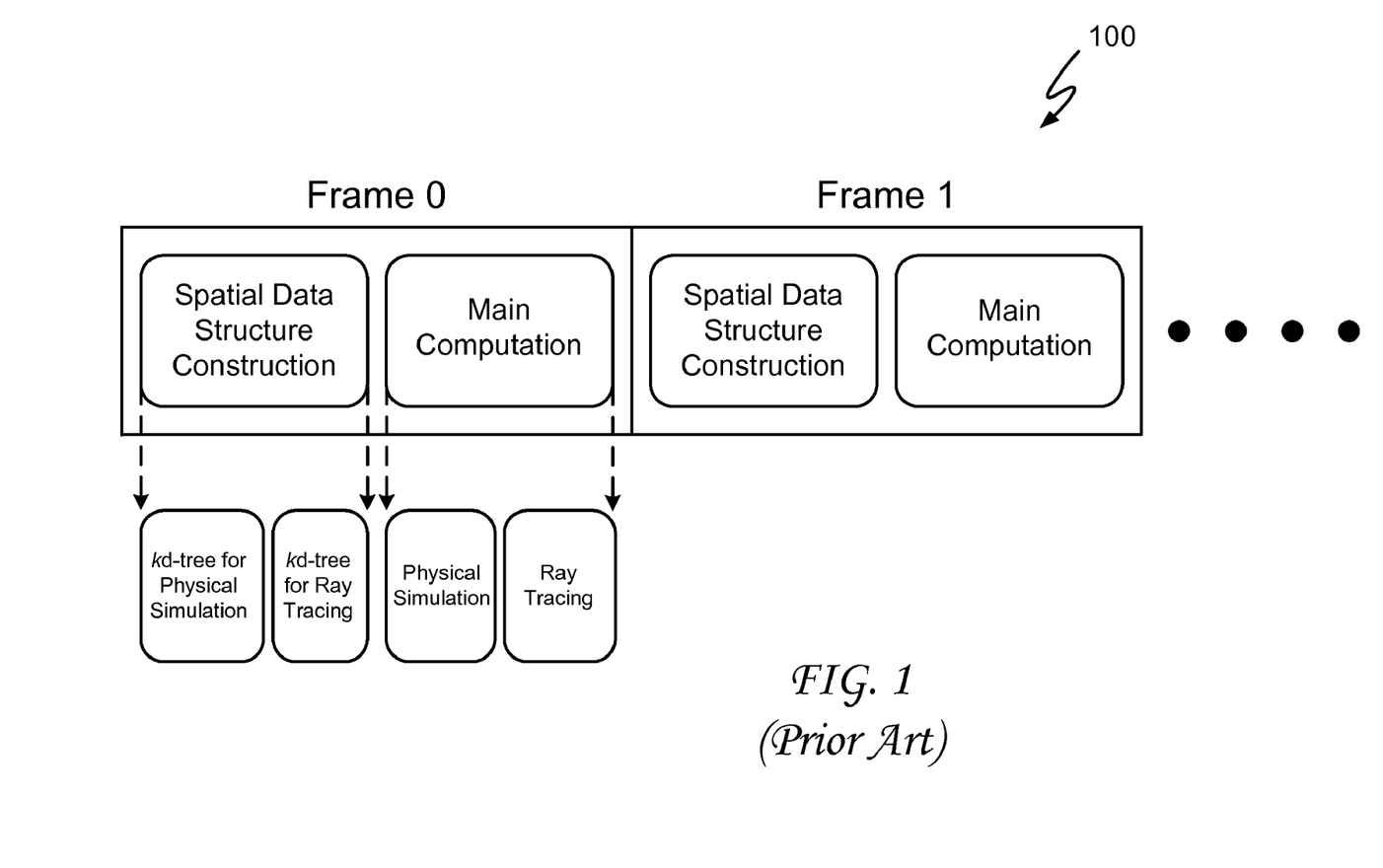
FIG. 1 is a representation of an existing process surrounding the creation of computer-generated imagery according to the prior art.

Referring now to the drawings, FIG. 1 is a representation of an existing process 100 surrounding the creation of computer-generated imagery according to the prior art. FIG. 1 shows an application consisting of physical simulation and ray-tracing kernels. Each of these kernels builds its own acceleration data structures (kd-trees are shown but any data structure could be used) that are specialized for the kernel. The prior art thus pays the cost of constructing both kd-trees per frame.

Figure 2:
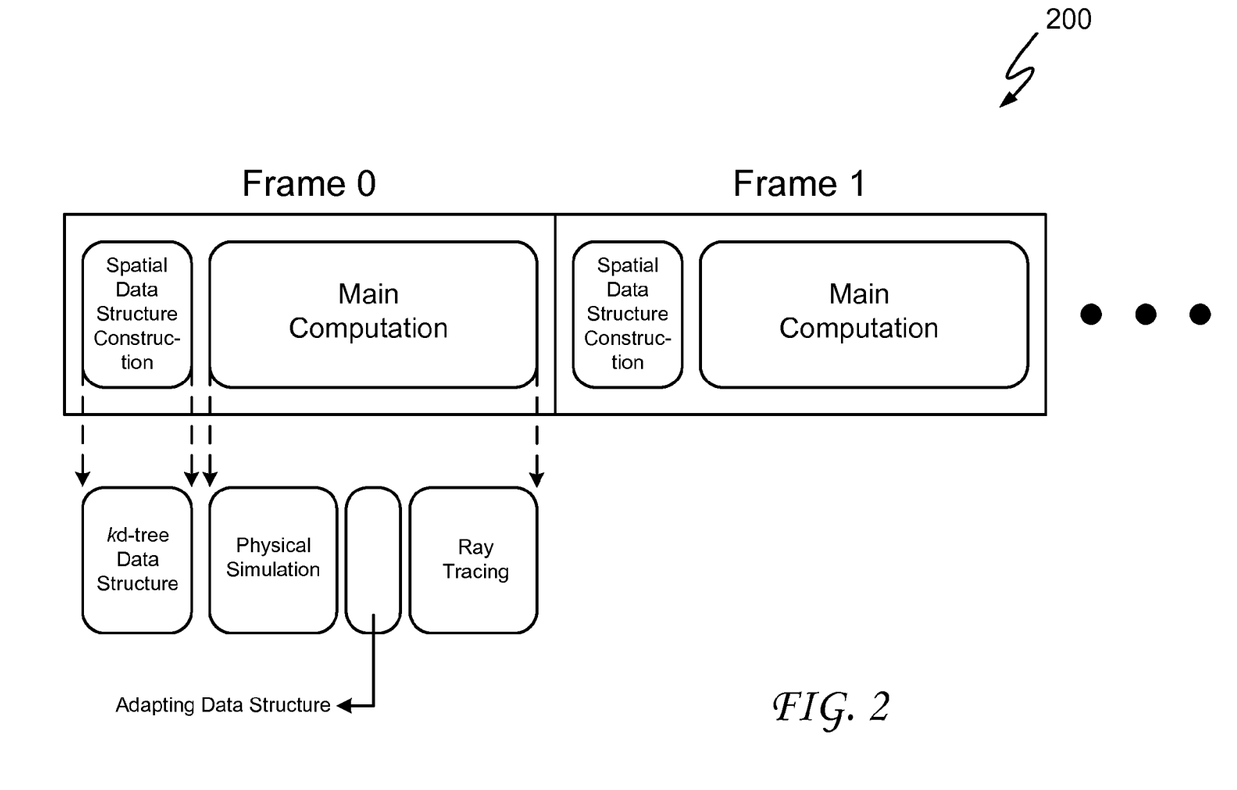
FIG. 2 is a representation of a process surrounding the creation of computer-generated imagery according to an embodiment of the invention.

FIG. 2 is a representation of a process 200 surrounding the creation of computer-generated imagery according to an embodiment of the invention. As illustrated in FIG. 2, process 200 constructs one kd-tree for physical simulation and then adapts the data structure for ray-tracing. As an example, the physical simulation engine may be based on the source repository referred to as PhysBAM (from Stanford University). Techniques for quickly adapting data structures for different visual computing kernels at low construction cost have been identified (represented by the "adapting data structure" box in FIG. 2); these retain most of the efficiency of a specialized data structure for each kernel. This results in a new saving in construction plus computation time for both kernels put together.

Figure 3:
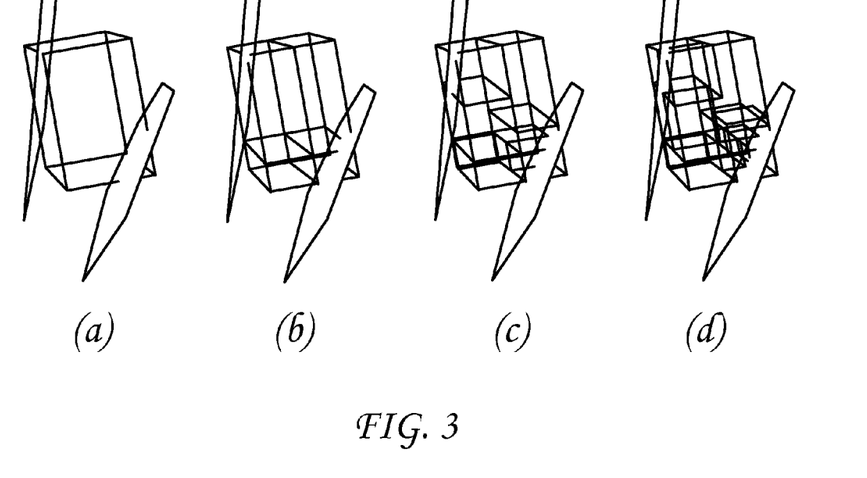
FIG. 3 shows a set of progressive refinements on a leaf node according to a data structure modification according to an embodiment of the invention.

As an example, taking a kd-tree built by a physical simulation engine and adapting it for a ray tracing engine (this is the situation depicted in FIG. 2) may be accomplished by adapting the Surface Area Heuristic to refine the leaf nodes of the PhysBAM tree, as $$C_{SAM}(x) = C_1 + C_L(x)\frac{SA_L(v, x)}{SA(v)} + C_R(x)\frac{SA_R(v, x)}{SA(v)}, \qquad (1)$$

where $C_1$ is the node traversal cost, $C_L(x)$ is the node collision cost: number of left child primitives, $C_R(x)$ is the node collision cost: number of right child primitives, $$\frac{SA_L(v, x)}{SA(v)}$$

is the surface area ratio of left child to parent, and $$\frac{SA_R(v, x)}{SA(v)}$$

is the surface area ratio of right child to parent. Split points that isolate empty space may be identified (since that reduces the area of the nodes consisting of the triangles) as may split planes coincident with the intersection points of the triangles with the nodes. FIG. 3 shows the results using a set of progressive refinements (beginning at 3a and proceeding through 3b and 3c to 3d) on a leaf node. As illustrated, the leaf node is subdivided to carve away empty space. As compared to the original ray-tracing tree where this process needs to be carried out for the complete 3D space, embodiments of the invention use a "good" tree as the starting point and carry out a similar strategy at a reduced cost (in terms of time and space).

For the situation depicted in FIG. 2 (i.e., adapting/modifying the kd-tree built for physical simulations and using that modified kd-tree to speed up ray-tracing) an exemplary adapted kd-tree achieves 82 percent of the frame rate of the kd-tree built specifically for the purpose of ray-tracing, and the time required for the adaptation/modification is negligible (less than 1 percent of the cost of building it). Similarly, an exemplary BVH built for physical simulations achieves 86 percent of the rendering rate (after modification) achieved by a dedicated BVH built by the ray-tracer, where again the required modification time is negligible compared to the construction time.

For the server-side visual simulation loop, sharing hierarchical spatial data structures between physical simulation and visibility computation requires only approximately two thirds of the memory space required for maintaining data structures separately. (As an example, this is equivalent to 20 MB of memory space reduction for the Boeing model).

As has been discussed above, embodiments of the invention propose the idea of building a common data structure for the complete visual simulation loop. This common data structure is adapted for each specific kernel and thus can achieve near-optimal performance. The modifications are necessary in order to make the data structure more amenable to the specific criterion required by a specific computational kernel. This may be required for at least the reasons discussed in the following two paragraphs.

For example, suppose the physical simulations and rendering (ray-tracing) are being performed on the client side. The physical simulation builds a kd-tree in order to speed up the computation of objects in close proximity. On the other hand, the ray-tracer builds a kd-tree that reduces the empty space within each of the nodes in order to speed up the ray-tracing performance. Hence, the first kd-tree may be modified in such a way that it also reduces the empty spaces and performs well for ray-tracing.

In addition, the resolution of the models being worked on may be different for the two applications. The physical simulation may work on a coarser model of the objects (to speed up run-time), and the rendering may work on a more refined version of the object (for increased realism). Under such circumstances, the new triangles have to be accommodated, leading to a modified tree.

The foregoing discussion focused on a kd-tree built by a physical simulation engine and subsequently adapted for ray tracing. Different embodiments of the invention may take a different approach, such as a kd-tree built by a ray-tracer and adapted by a physical simulation engine for its own requirements (discussed next) or a BVH built and modified in similar ways (discussed below).

For a kd-tree built by a ray tracer and subsequently modified for a physical simulation engine (based on PhysBAM, for example), a unified spatial hierarchy structure may be envisioned. This involves dividing various sets of primitives by the same hierarchy. PhysBAM needs the coarse vertices, triangles, and line segments to do collision detection, while the ray tracers provide a hierarchy over the fine triangles. What is needed then is for the coarse primitives to be pushed down the hierarchy that was provided by the fine triangles. (A few exceptional cases may require extending the hierarchy to conform to PhysBAM's termination heuristic.) More specifically, since the ray-tracer works on a finer mesh, no modifications to the tree are necessary: the leaf nodes just need to be populated with the relevant triangles of the objects used by the physics loop. This is easily accomplished by pushing the triangles from the root based on the node that best fits the triangle. As an example, this may be done using median split and, further, can be done in linear time (as compared to O(n log n) time for building such trees from scratch), leading to a very significant reduction in run-time.

Results for scenarios involving BVHs together with a summary of the kd-tree scenarios described above will now be set forth. The ray tracer based on BVH is referred to as X-Ray. The ray tracer based on kd-trees is referred to as MLRTA.

1. PhysBAM KD-Tree→MLRTA (82% of the rendering performance)
2. PhysBAM BVH→XRay (86% of the rendering performance)
3. MLRTA KD-Tree→PhysBAM (0.3% degradation in the PhysBAM performance)
4. Xray BVH→PhysBAM (0.5% degradation in the PhysBAM performance)

It is reiterated that in all the scenarios above the data structure is only built (and adapted) once per-frame; this saves a significant about of time compared to that required for building multiple data structures for individual applications and leads to a reduction in the run-time (by 15-20 percent) for all tested scenarios. To pick a specific example from the above results, in (1), the time to build the acceleration data structure for rendering is around 20 percent of the frame time. Although the rendering rate falls by 18 percent, only 10 percent of the frame time is spent in ray-tracing, leading to a slowdown of 1.8 percent—an overall gain of 18.2 percent in the frame time. This leads to an overall increase in the frame rate for the total 3D visual simulation loop, leading to a better experience. It should be mentioned here that although the focus thus far has been on scenarios where the physics engine and the ray-tracer are being executed, the concepts disclosed herein can easily be extended to other scenarios (including, for example, visibility computations which will be discussed next (in the context of a Virtual World environment)).

Virtual World servers need to simultaneously support various tasks (physical simulation, visibility computation, AI, etc). The following discussion focuses on an example in which hierarchical spatial data structures like kd-trees that have been built for physical simulation can be used for visibility computations in virtual world servers.

Server-side visibility computations can substantially reduce the server network bandwidth requirements and client-side rendering resources. Only a small portion of the virtual world will be seen by a client at a given point. Therefore, it would be wasteful to send updates to the entire world on every frame. Instead, servers look at all the objects visible from an area and send only potentially visible objects for which updates need to be sent a client. Embodiments of the invention perform conservative visibility computation from an area, meaning that only truly invisible objects within an area are categorized as invisible. (Invisible objects may be categorized as visible, resulting in overestimation of visible object sets).

An important concept relating to the use of hierarchical spatial data structures in visibility computations is that objects that are hidden need not be considered as occluders. As an example, consider the bounding boxes of three axis-aligned cuboidal structures, called BB1, BB2 and BB3, arranged in such a way that when viewed from a certain direction BB3 is hidden from view by BB2 while both are hidden from view by BB1. In the normal course of events we would include BB1, BB2, and BB3 once as occluders. However, any object that is occluded by BB2 is also occluded by BB1—hence it suffices to consider BB1 as an occluder. If it were possible to quickly determine which objects were visible, the number of objects rasterized as occluders could be reduced.

To that end, if the bounding box of an object is invisible, then the object must be invisible. On the other hand, if the bounding box is visible, then we cannot say whether the object is invisible or not, and must actually rasterize as an occluder. An experiment was performed (using both the UNC powerplant model and the Boeing model) using only leaf nodes of a hierarchical spatial data structure in order to speed up visibility queries. It was found that this scheme significantly reduces the number of objects rasterized, leading to speedups of 2-3 times compared to the case without using any spatial data structures. When a spatial data structure built for physical simulation is shared for visibility computation, 33 percent of the memory space dedicated to the spatial data structure can be saved. (Since physical simulation maintains hierarchical data structures, the total number of nodes required are twice the required number of leaf nodes.) Thus, sharing data structures can save as much as the number of leaf nodes, resulting in a 33 percent reduction as compared to maintaining separate data structures. With the Boeing model that has 756,417 objects, this 33 percent reduction results in about 20 MB of memory space savings.

Figure 4:
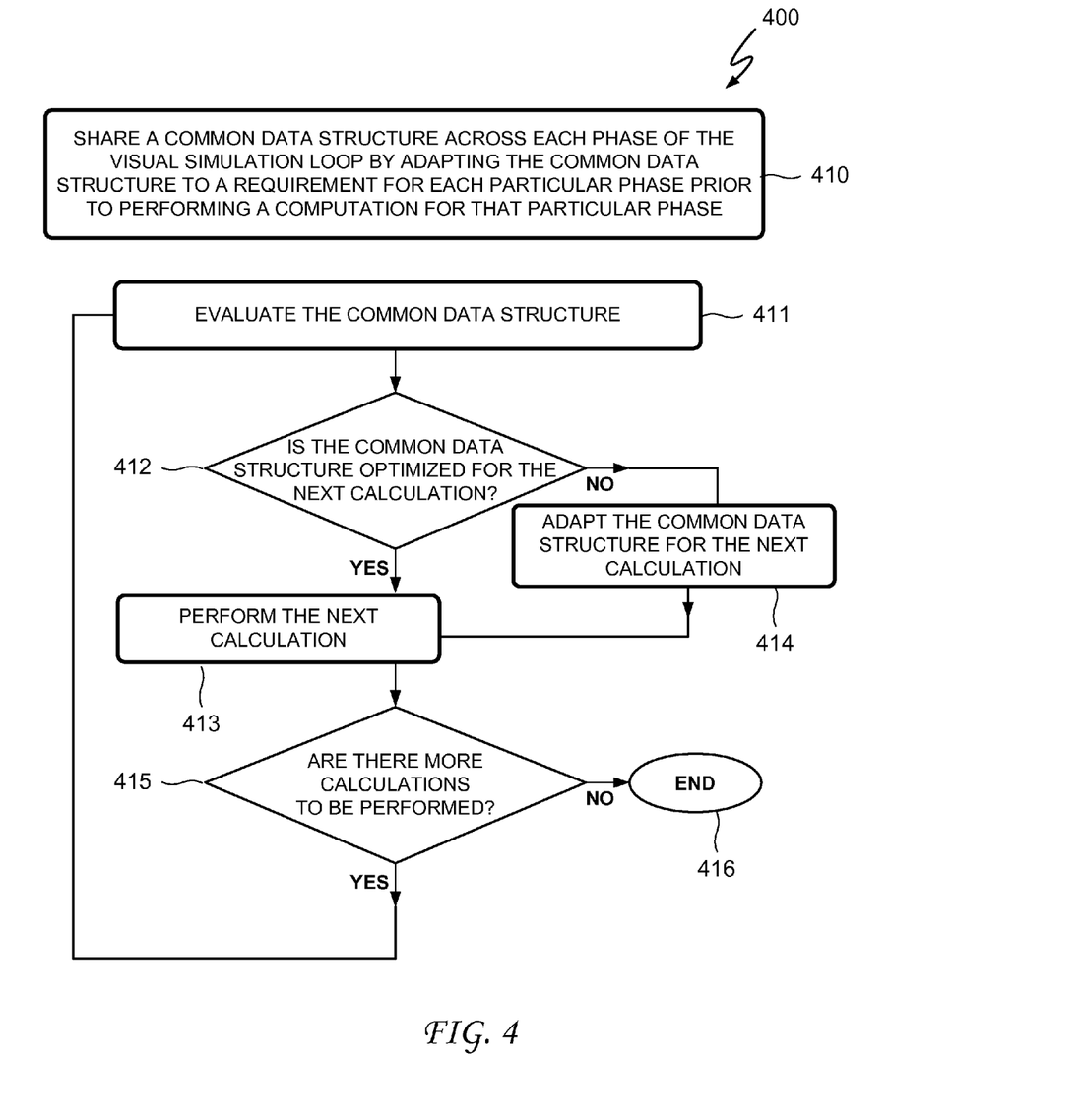
FIG. 4 is a flowchart illustrating a method of decreasing a total computation time for a visual simulation loop according to an embodiment of the invention.

FIG. 4 is a flowchart illustrating a method 400 of decreasing a total computation time for a visual simulation loop according to an embodiment of the invention.

A step 410 of method 400 is to share a common data structure across each phase of the visual simulation loop by adapting the common data structure to a requirement for each particular phase prior to performing a computation for that particular phase. It should be understood that step 410 does not require the adaptation of the data structure for a given phase if the data structure is already optimized for that phase. As an example, no modification of the data structure will likely be required prior to using it for the computation for the first phase because the data structure would likely be optimized for that first phase during its construction.

Step 410 implies the performance of certain sub-steps; these are also illustrated in FIG. 4 and are discussed below.

A sub-step 411 of step 410 is to evaluate the common data structure which, it should be understood, has been built previously—typically by the phase of the visual simulation loop that will be the first to use the data structure. A sub-step 412 of step 410 is to determine whether the common data structure is optimized for the calculation that is next in line to be performed. If no calculations have yet been performed (for the current frame) then the next calculation to be performed is the first calculation and, as mentioned above, the common data structure will likely already be optimized for that calculation because it was built for that calculation. On the other hand, if the next calculation to be performed is not the first calculation, the common data structure may have to be optimized before it is used. This may be accomplished according to one or more of the optimization techniques disclosed herein or according to other optimization techniques as known in the art.

A sub-step 413 of step 410 is to perform the next calculation. This sub-step is performed immediately following sub-step 412 if sub-step 412 determines that the common data structure is optimized for the calculation that is next in line to be performed. If the common data structure is not optimized for the calculation that is next in line to be performed, sub-step 413 is preceded by a sub-step 414 of step 410, which is to adapt the common data structure for the next calculation. As was just mentioned, this calculation may be accomplished according to one or more of the optimization techniques disclosed herein or according to other optimization techniques as known in the art.

A sub-step 415 of step 410 asks whether there are additional calculations to be performed. If there are, the method returns to sub-step 411 and the process is repeated. If there are not, the method ends (sub-step 416).

In one embodiment, the visual simulation loop comprises a physical simulation phase, a visibility computation phase, an artificial intelligence phase, and a rendering phase. In a particular embodiment, the visual simulation loop is handled at a first processing device (e.g., a server) and a second processing device (e.g., a client), with the first processing device performing the artificial intelligence phase, the visibility computation phase, and a first instance of the physical simulation phase and the second processing device performing the rendering phase and a second instance of the physical simulation phase. As an example, the common data structure can comprise a kd-tree, a BVH, a bounding interval hierarchy (BIH), or some other partitioning data structure.

In one embodiment, the first phase is a physical simulation phase, the second phase is a rendering phase, and adapting the data structure comprises performing the Surface Area Heuristic in 3D. In another embodiment, the first phase is a rendering phase, the second phase is a physical simulation phase, and adapting the data structure comprises identifying a spatial hierarchy structure comprising a root node and leaf nodes, identifying a plurality of primitives used by the rendering phase, and populating the leaf nodes with particular ones of the plurality of primitives, i.e., the relevant triangles (or other primitives) needed by the physical simulation engine. Populating the leaf nodes may be performed in linear time (as opposed to O(n log n) time), leading to a significant reduction in run time.

Figure 5:
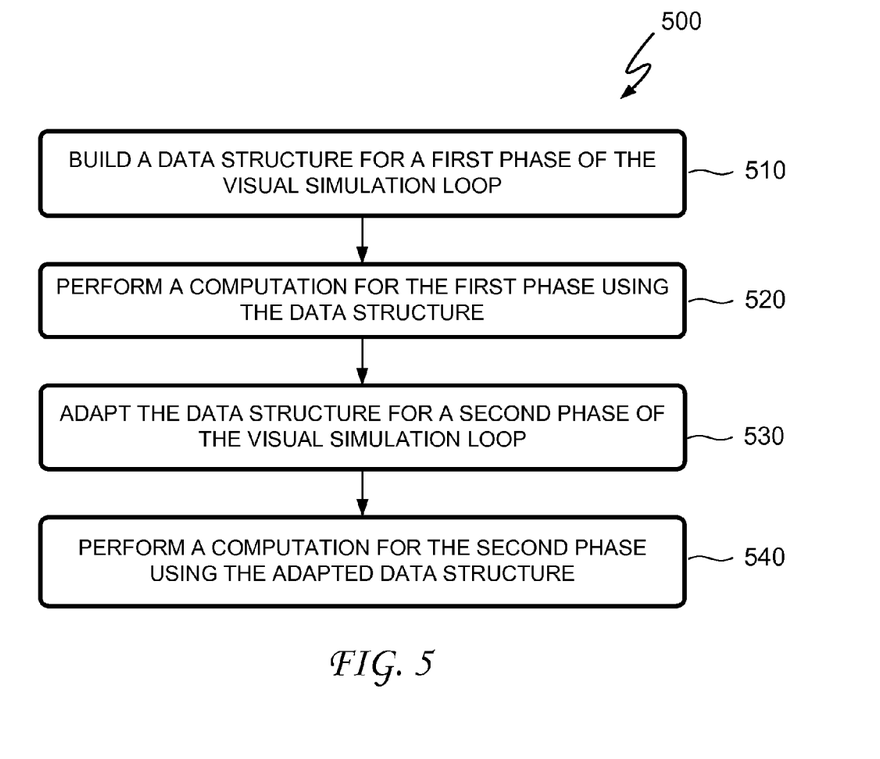
FIG. 5 is a flowchart illustrating a method of enabling a visual representation on an electronic display of a virtual scene generated by a visual simulation loop according to an embodiment of the invention.

FIG. 5 is a flowchart illustrating a method 500 of enabling a visual representation on an electronic display of a virtual scene generated by a visual simulation loop according to an embodiment of the invention.

A step 510 of method 500 is to build a data structure for a first phase of the visual simulation loop. In one embodiment, as was true of method 400, the visual simulation loop comprises a physical simulation phase, a visibility computation phase, an artificial intelligence phase, and a rendering phase, and the first phase can be any one of these (or others not listed). As was also true of method 400, in one embodiment the visual simulation loop is handled by a first processing device and a second processing device, the first processing device performs the artificial intelligence phase, the visibility computation phase, and a first instance of the physical simulation phase, and the second processing device performs the rendering phase and a second instance of the physical simulation phase.

A step 520 of method 500 is to perform a computation for the first phase using the data structure. A step 530 of method 500 is to adapt the data structure for a second phase of the visual simulation loop. A step 540 of method 500 is to perform a computation for the second phase using the adapted data structure.

If the visual simulation loop comprises additional phases, method 500 can further comprise adapting the data structure for each additional phase of the visual simulation loop and performing a computation for each additional phase of the visual simulation loop using a corresponding one of the adapted data structures, i.e., the data structure that was adapted for that particular additional phase. As has been mentioned elsewhere herein, the data structure can comprise a kd-tree, a BVH, a BIH, or the like. The identities of the first and second phases and the details of the adaptation can likewise be as set forth above.

Figure 6:
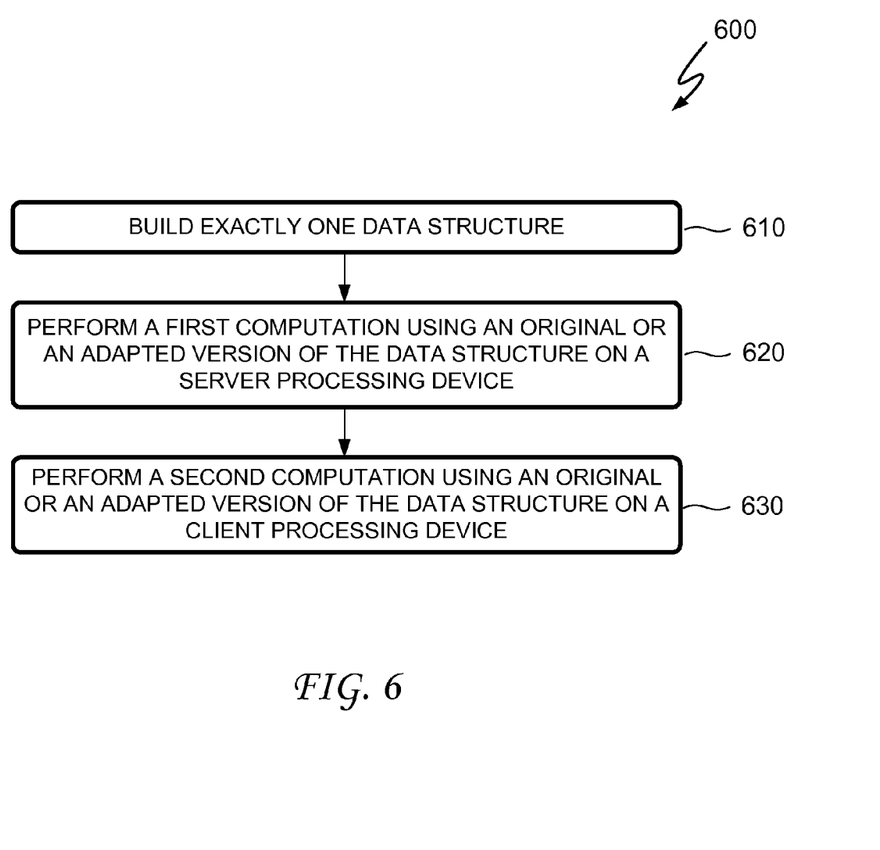
FIG. 6 is a flowchart illustrating a method of handling a visual simulation loop in a Virtual World application according to an embodiment of the invention.

FIG. 6 is a flowchart illustrating a method 600 of handling a visual simulation loop in a Virtual World application according to an embodiment of the invention. Each of the following steps of method 600 are performed for each time step or image update frame of the visual simulation loop.

A step 610 of method 600 is to build exactly one data structure. As an example, the data structure can be built by (or for) whatever phase of the visual simulation loop will perform the first calculation.

A step 620 of method 600 is to perform a first computation using an original or an adapted version of the data structure on a server processing device. As mentioned above, if the data structure is already adapted or optimized for the first computation then no adaptations will likely be necessary, while if the data structure was previously used and has not yet been adapted then the calculation will likely be enhanced is certain adaptations are made first.

A step 630 of method 600 is to perform a second computation using an original or an adapted version of the data structure on a client processing device. For this second computation certain adaptations are likely to be necessary or at least desirable in order to optimize system performance (although step 630 may in some embodiments be performed in the absence of such adaptations). Such adaptations, if performed, may be accomplished according to techniques disclosed earlier herein or according to other techniques as known in the art.

In one embodiment, the data structure resides in an on-chip cache of the client processing device. In the same or another embodiment, the first computation and the second computation are the only computations performed during the image update frame. In other embodiments, more than two calculations may be performed per frame.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the methods discussed herein may be implemented in a variety of embodiments, and that the foregoing discussion of certain of these embodiments does not necessarily represent a complete description of all possible embodiments.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of enabling a visual representation on an electronic display of a virtual scene generated by a visual simulation loop, the method comprising:
   building a data structure for a first phase of the visual simulation loop;
   performing a first computation for the first phase using the data structure;
   adapting the data structure for a second phase of the visual simulation loop; and
   performing a second computation for the second phase using the adapted data structure.

2. The method of claim 1 further comprising:
   adapting the data structure for each additional phase of the visual simulation loop; and
   performing a subsequent computation for each additional phase of the visual simulation loop using a corresponding one of the adapted data structures.

3. The method of claim 1 wherein:
   the visual simulation loop comprises a physical simulation phase, a visibility computation phase, an artificial intelligence phase, and a rendering phase.

4. The method of claim 3 wherein:
   the visual simulation loop is handled by a first processing device and a second processing device;
   the first processing device performs the artificial intelligence phase, the visibility computation phase, and a first instance of the physical simulation phase; and
   the second processing device performs the rendering phase and a second instance of the physical simulation phase.

5. The method of claim 1 wherein:
   the data structure comprises one of a kd-tree and a bounding volume hierarchy.

6. The method of claim 1 wherein:
   the first phase is a physical simulation phase and the second phase is a rendering phase; and
   adapting the data structure comprises performing a Surface Area Heuristic.

7. The method of claim 1 wherein:
   the first phase is a rendering phase and the second phase is a physical simulation phase; and
   adapting the data structure comprises:
      identifying a spatial hierarchy structure comprising a root node and leaf nodes;
      identifying a plurality of primitives used by the rendering phase;
      populating the leaf nodes with particular ones of the plurality of primitives.

8. The method of claim 7 wherein:
   populating the leaf nodes is performed in linear time.

9. A method of decreasing a total computation time for a visual simulation loop, the method comprising:
sharing a common data structure across each phase of the visual simulation loop by adapting the common data structure to a requirement for each particular phase prior to performing a computation for that particular phase.

10. The method of claim 9 wherein:
the visual simulation loop comprises a physical simulation phase, a visibility computation phase, an artificial intelligence phase, and a rendering phase.

11. The method of claim 10 wherein:
the visual simulation loop is handled at a first processing device and a second processing device;
the first processing device performs the artificial intelligence phase, the visibility computation phase, and a first instance of the physical simulation phase; and
the second processing device performs the rendering phase and a second instance of the physical simulation phase.

12. The method of claim 9 wherein:
the common data structure comprises either a kd-tree or a bounding volume hierarchy.

13. The method of claim 9 wherein:
a first phase of the visual simulation loop is a physical simulation phase and a second phase of the visual simulation loop is a rendering phase; and
adapting the common data structure comprises performing a Surface Area Heuristic.

14. The method of claim 9 wherein:
a first phase of the visual simulation loop is a rendering phase and a second phase of the visual simulation loop is a physical simulation phase; and
adapting the common data structure comprises:
   identifying a spatial hierarchy structure comprising a root node and leaf nodes;
   identifying a plurality of primitives used by the rendering phase; and
   populating the leaf nodes with particular ones of the plurality of primitives.

15. The method of claim 14 wherein:
populating the leaf nodes is performed in linear time.

16. A method of handling a visual simulation loop in a Virtual World application, the method comprising:
for each image update frame of the visual simulation loop:
   building exactly one data structure;
   performing a first computation using an original or an adapted version of the data structure on a server processing device; and
   performing a second computation using the original or an adapted version of the data structure on a client processing device.

17. The method of claim 16 wherein:
the data structure resides in an on-chip cache of the client processing device.

18. The method of claim 16 wherein:
the first computation and the second computation are the only computations performed during the image update frame.

19. The method of claim 16 wherein:
the data structure comprises one of a kd-tree and a bounding volume hierarchy.

* * * * *